(12) United States Patent
Mughal et al.

(10) Patent No.: US 10,873,727 B2
(45) Date of Patent: Dec. 22, 2020

(54) SURVEILLANCE SYSTEM

(71) Applicant: COMSATS University Islamabad, Islamabad (PK)

(72) Inventors: Muhammad Junaid Mughal, Islamabad (PK); Adnan Iftikhar, Islamabad (PK)

(73) Assignee: COMSATS UNIVERSITY ISLAMABAD, Islamabad (PK)

( * ) Notice: Subject to any disclaimer, the term of this patent is extended or adjusted under 35 U.S.C. 154(b) by 0 days.

(21) Appl. No.: 16/190,150

(22) Filed: Nov. 14, 2018

(65) Prior Publication Data
US 2019/0349551 A1    Nov. 14, 2019

(30) Foreign Application Priority Data

May 14, 2018    (PK) .................................... 348/2018

(51) Int. Cl.
*H04N 7/18*      (2006.01)
*G10L 21/0232*   (2013.01)
*H04N 5/247*     (2006.01)
*H04R 1/40*      (2006.01)
*H04R 3/00*      (2006.01)
*G10L 21/0208*   (2013.01)

(52) U.S. Cl.
CPC .......... *H04N 7/181* (2013.01); *G10L 21/0232* (2013.01); *H04N 5/247* (2013.01); *H04R 1/406* (2013.01); *H04R 3/005* (2013.01); *G10L 2021/02082* (2013.01); *H04R 2201/403* (2013.01)

(58) Field of Classification Search
CPC .... G06F 3/165; G06F 3/0482; G06F 17/5004; H04R 1/406; H04R 29/001; H04R 3/005; H04R 2201/403; G06K 9/00335; H04N 7/181; H04N 5/247; G10L 21/0232; G10L 2021/02082
See application file for complete search history.

(56) References Cited

U.S. PATENT DOCUMENTS

| | | | |
|---|---|---|---|
| 7,039,199 B2 * | 5/2006 | Rui ........................ | H04R 3/005 348/14.08 |
| 9,635,186 B2 | 4/2017 | Pandey et al. | |
| 9,641,688 B2 | 5/2017 | Pandey et al. | |
| 2006/0088173 A1 * | 4/2006 | Rodman ................ | H04R 1/025 381/92 |
| 2010/0208903 A1 * | 8/2010 | Heigl ...................... | H04R 5/02 381/58 |

(Continued)

*Primary Examiner* — Dramos Kalapodas
(74) *Attorney, Agent, or Firm* — Oliff PLC

(57) ABSTRACT

A surveillance system includes: a plurality of planar microphone arrays configured to generate audio signals; a plurality of close circuit television (CCTV) cameras configured to generate video signals and integrated to the planar microphone arrays; and a delay network including: a signal processor configured to analyze audio signals and video signals; delay modules including: a first delay network incorporated at the input of individual microphone in single microphone planar microphone array; and a second delay network placed before combining the output of the individual microphone planar microphone array, wherein the signal processor by using the CCTV cameras, may be configured to calculate the position coordinates of the target object by defining the area in grids.

7 Claims, 7 Drawing Sheets

(56) References Cited

U.S. PATENT DOCUMENTS

| | | | |
|---|---|---|---|
| 2013/0315038 A1* | 11/2013 | Ferren | G06F 3/041 367/197 |
| 2013/0315404 A1* | 11/2013 | Goldfeder | H04R 3/005 381/58 |
| 2014/0341392 A1* | 11/2014 | Lambert | H04R 3/04 381/92 |
| 2016/0142620 A1* | 5/2016 | Sawa | H04N 5/23216 348/143 |
| 2016/0163168 A1* | 6/2016 | Brav | G08B 13/1672 381/56 |
| 2016/0188755 A1* | 6/2016 | Gonzalez-Banos | G06F 17/5004 703/1 |
| 2017/0019744 A1* | 1/2017 | Matsumoto | H04R 29/008 |
| 2017/0222829 A1* | 8/2017 | Kessler | H04L 12/40039 |
| 2018/0088900 A1* | 3/2018 | Glaser | H04R 3/005 |

* cited by examiner

SURVEILLANCE SYSTEM

CROSS-REFERENCE TO RELATED APPLICATION

This application claims priority from and the benefit of Pakistan Patent Application No. 348/2018, filed on May 14, 2018, which is hereby incorporated by reference for all purposes as if fully set forth herein.

BACKGROUND

Field

Exemplary embodiments of the invention relate generally to the mechanism and method of achieving high directionality in sound reception with identification of the sound source/target through video surveillance.

Discussion of the Background

Security is a foremost dilemma of the present world. Conventionally, video monitoring is normally done in environments using single or multiple closed-circuit television (CCTV) cameras. Concretely, from this video signal the suspects can be identified, but due to the crowded noisy environment the conversation cannot be heard. To hear the conversation of the suspect/suspects audio surveillance is also required and this can help in identifying any unusual activity. Different methods have been used to make microphones directional, e.g., by putting a single microphone at the focus of a parabolic dish. The problem with such methods is that the dish has to be physically directed towards the sound source and secondly the size of the dish cannot be made very large to make it more directional. Also, adaptive beamforming array has been proposed in past to receive sound in teleconferencing applications. It's a single array of microphones having limited aperture size and therefore has limited directionality and is not suitable for very noisy environment.

The prior art is deficient with respect to the highly directional sound reception among a group of people in large arenas such as concerts, presentations, and seminars etc. There are variety of needs for highly directional sound receivers with video surveillance to isolate a conversation of certain people among the group to provide security measure in a crowded place from bomb blasts and other happenings by identifying the suspect group's communication. These applications also include the voice monitoring of the people in crowded places to filter out suspects and to avoid their pre-planned activities.

Another area of use is in monitoring suspicious activity in crowded environments such as airport lounge for the security purposes. The prior art is replete with myriad and diverse directional apparatus for sound projection and receiver apparatus with video capabilities in large arenas.

Furthermore, the conference room environment has been viewed as a traditional scenario for many decades. The layout of the room has been constant in this manner that microphones are mounted on the main center table and designated person has to turn towards the microphone while addressing other meeting members of the meeting. Though this construction art of the conference/meeting room is adequate for the basic purpose and designated operation, but conventional art is incapable of directing the acoustic profile of the person speaking in more efficient and relaxed manner. However, Clearone Inc. patented technology of microphone beam forming array 2 technology remove the hassle of wires on the meeting table and provide efficient way of communication without focusing on the microphone. The patented beamforming array 2 technology has only been used in small conferences rooms but is not able to receive highly directional sound in large convention centers and large places where open discussions are conducted amongst large group of people. Therefore, there is a need to be able to pin point on any sound source in a noisy environment, combined sound with additional advantage of video contents of the person speaking in such an environment.

SUMMARY

Devices constructed and methods according to exemplary embodiments of the invention are capable of providing an enhanced sound receiver integrated with video surveillance equipment.

Additional features of the inventive concepts will be set forth in the description which follows, and in part will be apparent from the description, or may be learned by practice of the inventive concepts.

According to one or more embodiments of the invention, a surveillance system including: a plurality of planar microphone arrays configured to generate audio signals; a plurality of closed-circuit television (CCTV) cameras configured to generate video signals and integrated to the planar microphone arrays; and a delay network including: a signal processor configured to analyze audio signals and video signals; delay modules including: a first delay network incorporated at the input of individual microphone in single microphone planar microphone array; and a second delay network placed before combining the output of the individual microphone planar microphone array, wherein the signal processor by using the CCTV cameras, may be configured to calculate the position coordinates of the target object by defining the area in grids.

The combined output of all the planar microphone arrays is fed into a single delay unit to minimize the circuit complexity as compared to the individual delay units with each array.

The surveillance system may include only one noise filtration block integrated in the delay network unit for selecting the more suitable echo cancelled signal.

The signal processor may include a single processor.

According to one or more embodiments of the invention, a method of providing a surveillance service using the system of claim 1, the method including: identifying a surveillance target using the CCTV cameras installed at various places in a premises by defining the area in grids; recording the conversation of the surveillance target using the plurality of planar microphones arrays installed at various places in the premises; and receiving and analyzing the audio and video signals using the signal processor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
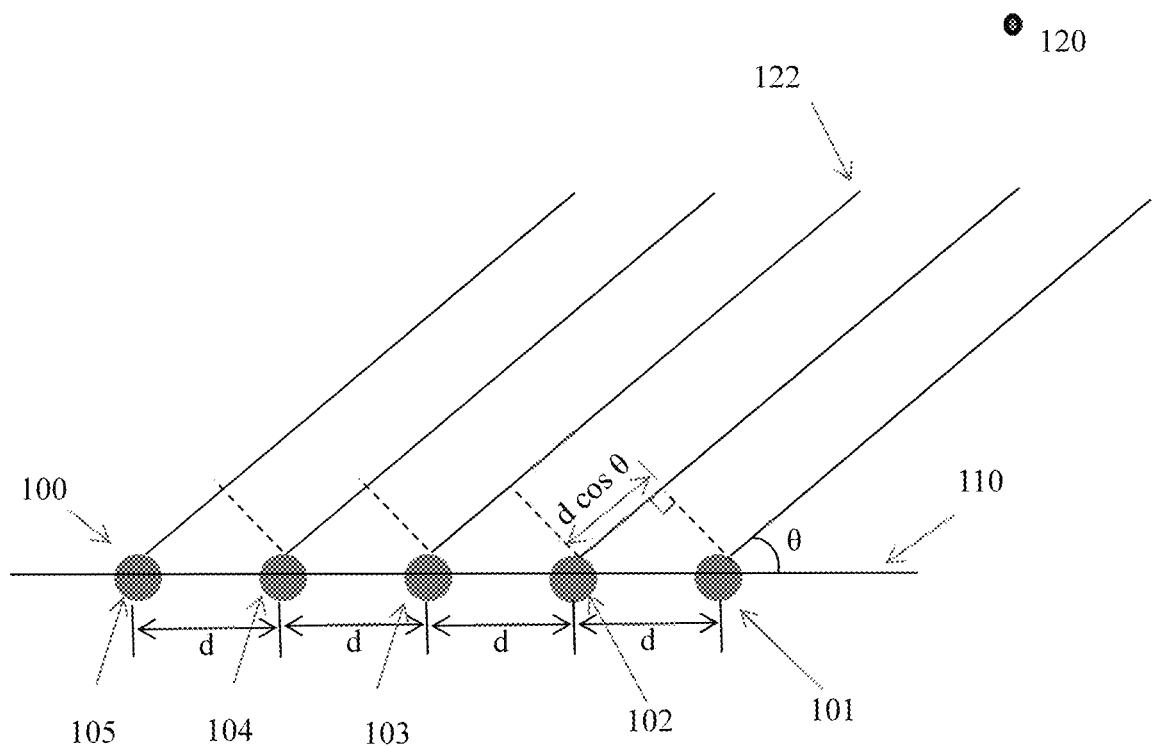
FIG. 1A is the block diagram of a single linear microphone array with one stage of variable delay network for each individual microphone to focus at particular point in space.

For the description of the disclosure in sufficient details and practicing the invention, the disclosed embodiments are intended to describe. The drawings may be utilized with minor changes without affecting the scope of the invention. A detailed description of the present invention is relating to the included claims and is not taken in a limiting sense.

Embodiments of the present disclosure include indoor environment apparatus that combines planar microphone arrays with CCTV cameras. The present invention first identifies a person or group of suspects in crowded places such as airport lounges and bus terminals etc. and captures the conversation of the person or suspect group using series of planar microphones arrays installed on the ceiling and walls. The audio and video surveillance apparatus described in this present disclosure is applicable to any indoor arena.

An audio microphone normally has a wide sound acceptance pattern as it can accept sound wave from all direction in front of the microphone with approximately same signal strength. Therefore, it is very difficult to differentiate between signals coming simultaneously from different directions. To make audio microphones directional, i.e., accept sound signals from desired direction only, audio microphone arrays are used. The audio signal from the sound source is received at all the microphones in the array. Depending on the position of the sound source and the individual microphones, different microphones will receive the audio signal with different time delays.

The exemplary embodiments of the current inventive idea are intended to focus on achieving sound of the suspected subjects in densely populated places such as airport lounge, shopping malls, and subway terminals, etc., along with the video monitoring on a remote screen. Moreover, this invention discusses the technology of mounting series of planar microphone arrays on the ceiling and walls of the environment which needs to be monitored. This operation of receiving audio contents in noisy and crowded environment is achieved in this invention by designing and developing fully automated audio processing system which can eliminate the surrounding noise and only listens to the suspect's communication and integrating audio apparatus with an existing video apparatus for enhanced security. In the present inventive idea, multiple microphone arrays comprising multiple microphones in each array are used (installed at various places in the premises), and thus increase the overall aperture of the microphone array. Therefore, the proposed invention increases the directionality and has noise suppression and echo cancellation capabilities to suppress unwanted and unpredicted noise and echo in the crowded arena. The proposed system of the planar microphone arrays with multiple delay networks for the delay compensation incurred by the placement of a microphones sub-arrays and delay compensations of microphones array because of the placement of arrays at various positions. The placed microphone arrays are flat in profile and are concealed in the ceiling and walls of the desired area, are proposed to be used for listening to the sound of the suspect/suspects in large and noisy places that is identified by the existed video surveillance apparatus. However, current innovative idea also relates to the development of software that has flexibility to be integrated with the existing video surveillance procedures. The current innovative idea provide interface to the user/security person to select the target area amongst group of people present in the indoor crowded area and initiate 'capture sound in the highlighted area' command. The initiated command divides the floor of the crowded place in a 2-D rectangular grid and identify position coordinates of the selected target object. Accordingly, the multiple microphone arrays installed at various positions in the desired area are actuated using an automated system and used simultaneously to increase the focusing capability of the microphones.

Multiple video surveillance cameras such as closed circuit television (CCTV) cameras are used to uniquely identify the exact position of the target. Then, the planar microphone arrays (whose working is explained later) are directed to listen to the target conversation by identifying the location of the sound source (suspect). A high-quality sound is received at output by calculating and compensating the delay incurred by different microphones within a planar microphone array. Since series of planar microphones arrays are installed in the crowded places, another step of delay network is also incorporated in the setup for the compensation of overall planar microphone array with respect to its space coordinates. The planar microphones arrays work jointly to increase the directionality and thus enabling to listen to the desired signal with high fidelity.

In summary, the current invention uses a video signal to identify the location of the suspect in a large arena/premises and the position coordinates of the suspect are then passed on to the delay networks which directs all the individual planar microphones arrays at the target. Then a high-quality conversation is listened at the remote end with video contents by further refining, echo cancellation, and signal processing of the incoming conversation.

Reception of the sound and filtration process of the voice communication among the group of people or a person communicating on cell phone requires highly directional sound receivers. We have presented a highly directional sound receiver which is able to listen to the conversation between the targeted groups or an individual in an indoor environment along with the video surveillance of the targeted group. To the best of knowledge of authors, a combined product having video and audio surveillance, having high directionality, to focus on the sound source, along with high echo cancellation property that is used for large indoor and outdoor environments has neither been discussed in literature nor it has been patented.

This disclosure describes a fully automated and state of the art apparatus to hack audio contents of the suspect group in indoor environment along with the video monitoring of the sensitive places for the safety of the community. This apparatus provides an advanced security feature for crowded places. The complete system includes sets of video monitoring cameras for the identification of the position coordinates of the target group in indoor arena. The system is further equipped with the multiple delay networks; one step of delay network is incorporated at the input of individual microphones in single planar microphone array and the second delay network is placed at the combined output of the planar microphone arrays. These delay networks are used for compensating the delay incurred at individual microphones and microphones arrays to receive in phase signal with high-quality sound. In addition, apparatus provides video and adjustable audio contents on the screen and speaker/headphone installed in the security rooms, respectively.

Further, the disclosure of the present invention provides that planar microphone arrays are directed to the specific location by using software nodes. Additionally, software is developed that provides integration of CCTV signals and direction of planar microphones arrays to the target group.

Figure 1B:
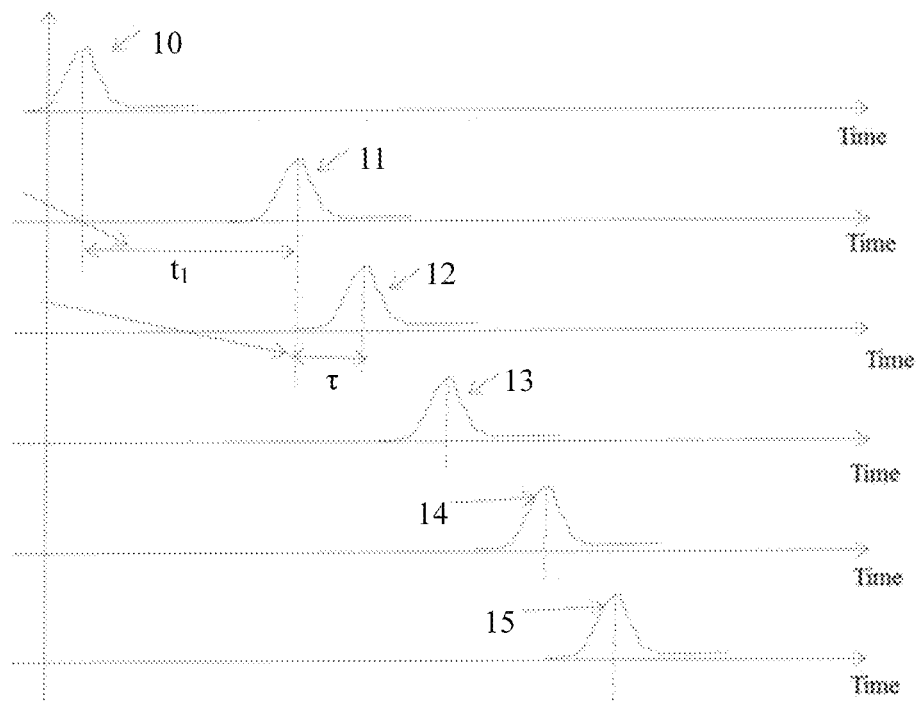
FIG. 1B illustrates the sound signal received by the individual microphones of the single microphone array of FIG. 1A.

FIG. 1A is the block diagram of linear microphone array 100 with one stage of variable delay network for each individual microphone to focus at particular point in space. FIG. 1B illustrates the sound signals 10, 11, 12, 13, 14, and 15 received by the individual microphones 101, 102, 103, 104, and 105 of the linear microphone array 100 of FIG. 1A.

All the microphones in the linear microphone array 100 are linearly placed on the axis 110 of the linear microphone array 100 with distance d between them. The sound wave 122 from the sound source 120 reaches different microphones at different times. In FIG. 1, the sound source 120 is shown to be at angle "θ" with the axis of the linear microphone array 100. The sound wave 122 first reaches a first microphone 101 disposed at the right end, at a time delay of $t_1$, corresponding with the distance between the distance between the sound source 120 and the first microphone 101. Then it reaches a second microphone 102, after travelling an extra distance of "d cos θ", this extra distance delays the waves by time τ seconds, where τ seconds can be calculated as follows:

$$\tau = \frac{d\cos\theta}{v} \quad (1)$$

Here, "v" is the speed of sound in meters per second (m/s), and d is the distance between microphones in meter (m). Accordingly, the time delay τ corresponds with the distance d between the first microphone 101 and the second microphone 102. A third microphone 103 will have a delay of 2τ, a fourth microphone 104 will have the time delay of 3τ, and a fifth microphone 105 will have the time delay of 4τ, relative to the first microphone 101, and so on.

The signal received at different microphones are then combined by adding all the received signals (e.g., by using a summing amplifier). Due to the different time delays at different microphones, the combined signal is not enhanced rather it is noisy and most probably ineligible. Therefore, the electrical signal from the individual microphones is given additional delay, by the variable delay module, to make the signals from all the microphones to have an equal time delay. Once these delayed signals are added, the signal from the desired direction may be enhanced and signal from unwanted directions is suppressed. This makes the microphone array directional. The variable delay module is designed by first digitizing the signal and then using memory modules e.g. shift registers to introduce delays and then digital output is converted back to analog signal and added by using summing amplifiers or any other circuit capable of adding signals.

Linear microphone arrays have a limitation that they can only resolve different signals in the plane of the array. They cannot differentiate between sounds coming from different azimuth angles, having same elevation angle. The principle used in linear microphone array is extended to planar microphone array. In the planar microphone array, microphones are arranged in a plane, therefore, they can resolve sounds coming from different directions in space using the same principle as the linear microphone arrays.

Figure 2:
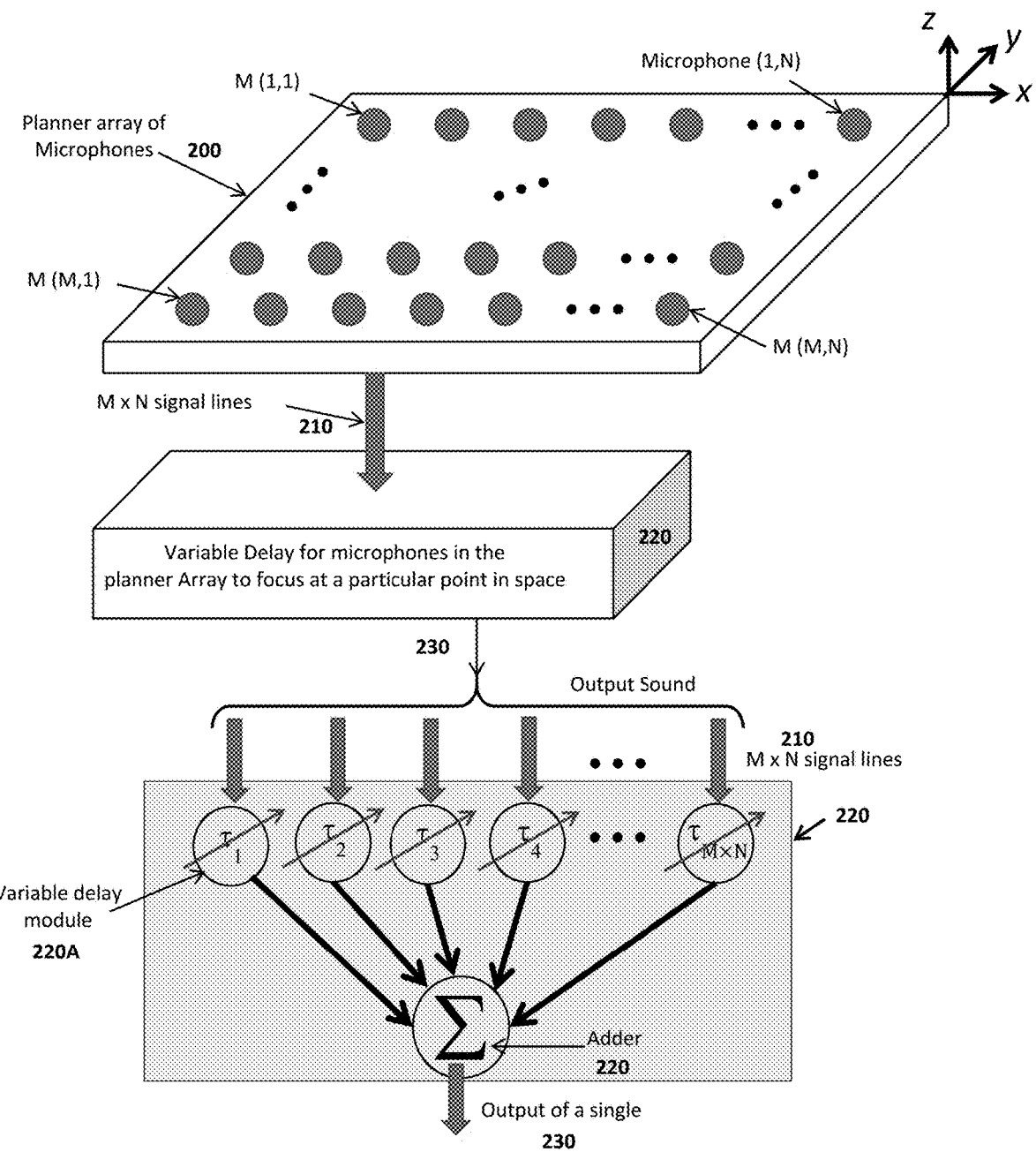
FIG. 2 is block diagram illustrating a planar microphone array with a variable delay network to focus at a particular point.

FIG. 2 is block diagram illustrating a planar microphone array 200, according to exemplary embodiment. FIG. 2 shows the planar microphone array 200, the microphones $M_{11}$ to $M_{MN}$ are uniformly arranged in the array. The planar microphone array 200 may receive sounds from the desired direction in the 3 dimensional environment. The sounds received by the planar microphone array 200 may be transmitted through signal lines 210. For example, the signal lines 210 may include M×N signal lines, each corresponding to the microphones $M_{11}$ to $M_{MN}$. The signal lines 210 may be applied with a variable delay 220. By applying a variable delay 220 to the signal lines 210, the microphone array 200 may be focused toward a particular point in space. Accordingly, the output signal 230 generated from the particular point in space may be generated. According to comparable embodiments, different methods have been used in the past to make microphones directional, e.g., by putting a single microphone at the focus of a parabolic dish. The problem with such methods is that first, the dish must be physically directed towards the sound source and second, the size of the dish cannot be made very large to make it more directional. With planar microphone arrays 200 according to the exemplary embodiments, there are no moving parts, the array can be conveniently mounted on the walls or the ceiling, and there is no need to direct the array in the desired direction. The direction of reception of the sound may be controlled electrically by the variable delay modules. Accordingly, planer microphone arrays may have more desirable and convenient properties in use.

Figure 3:
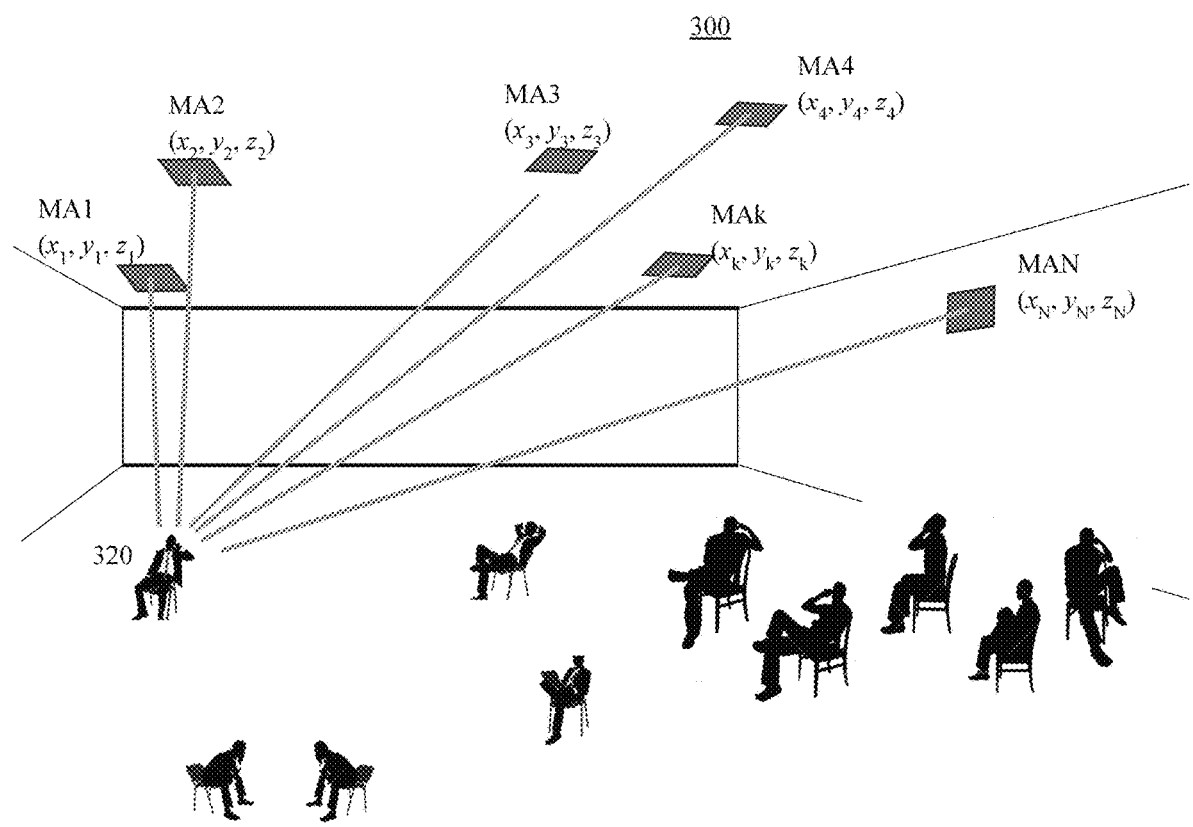
FIG. 3 is three-dimensional view (3-D) of an area equipped with multiple planar microphone arrays and focusing on target source according to the exemplary embodiments.

FIG. 3 is three-dimensional view (3-D) of an area equipped with multiple planar microphone arrays 300 and focusing on a target source 320 according to the exemplary embodiments. A single planar microphone array can be used for directional hearing of sound. Multiple planar microphone arrays can also be used simultaneously to listen to the target sound source 320 with enhanced directionality, as the effective aperture may be increased. When using multiple microphone arrays, their precise position relative to each other is required to counter the excess phase difference incurred due to their position with respect to the target sound source 320 and with respect to individual arrays. In the first phase, each array focuses itself to the target sound source 320 using its variable delay module. The signal from all the arrays focusing at the same sound source is not in phase. Therefore, further signal processing, i.e., addition of time delay in the output of all the arrays is required. This time delay is calculated using the precise position of the individual arrays. FIG. 3 illustrates that $1^{st}$ Array MA1 to $k^{th}$ Array MAk to $N^{th}$ Array MAN are respectively located at positions represented by coordinates $(x_1, y_1, z_1)$ to $(x_k, y_k, z_k)$ to $(x_N, y_N, z_N)$, respectively. Here, $(x_k, y_k, z_k)$ is the position of the $k^{th}$ array MAk with respect to a common point in the room.

Figure 4:
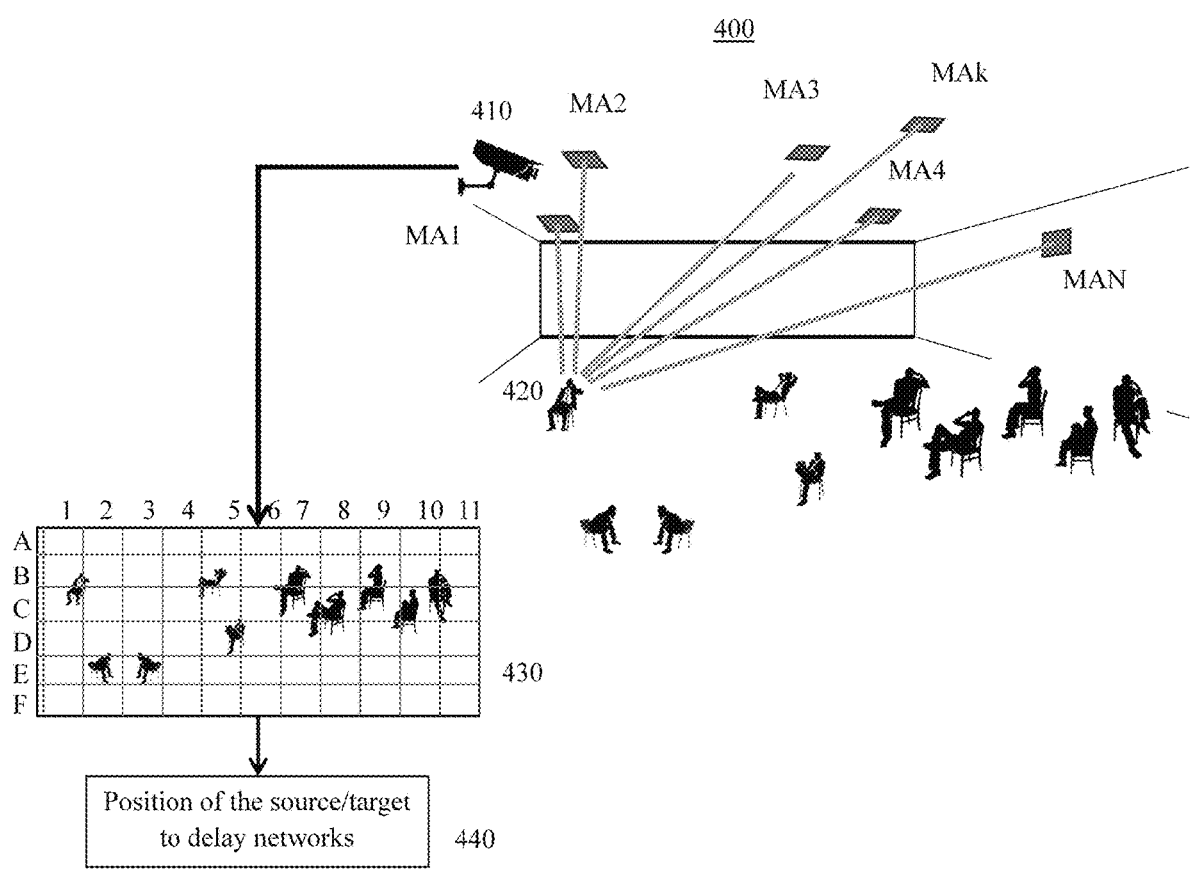
FIG. 4 shows the position identification of the target using CCTV camera by dividing 2-dimensional (2-D) plane in the rectangular grid, according to an exemplary embodiment.
Figure 5:
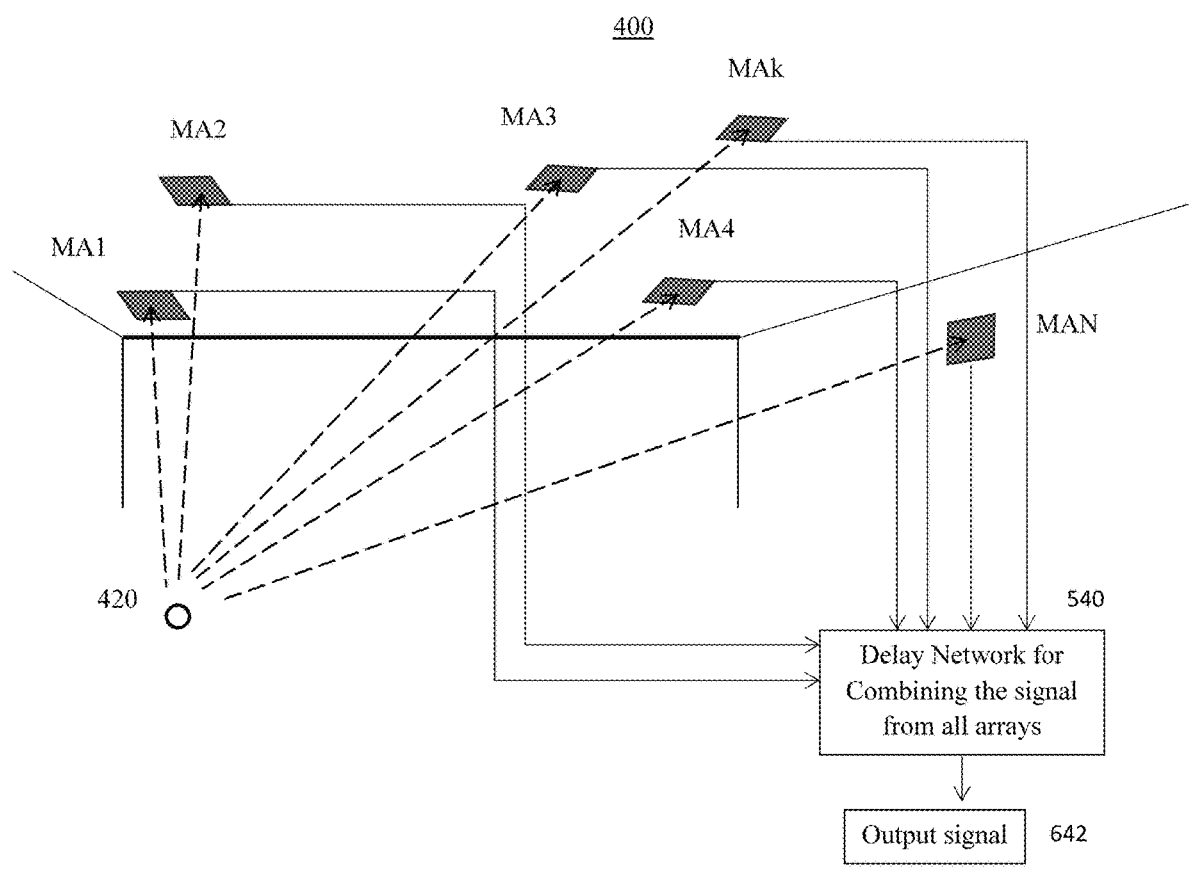
FIG. 5 shows the incorporation of delay network in the apparatus for the compensation of phase delays incurred because of the position of the planar microphone arrays.
Figure 6:
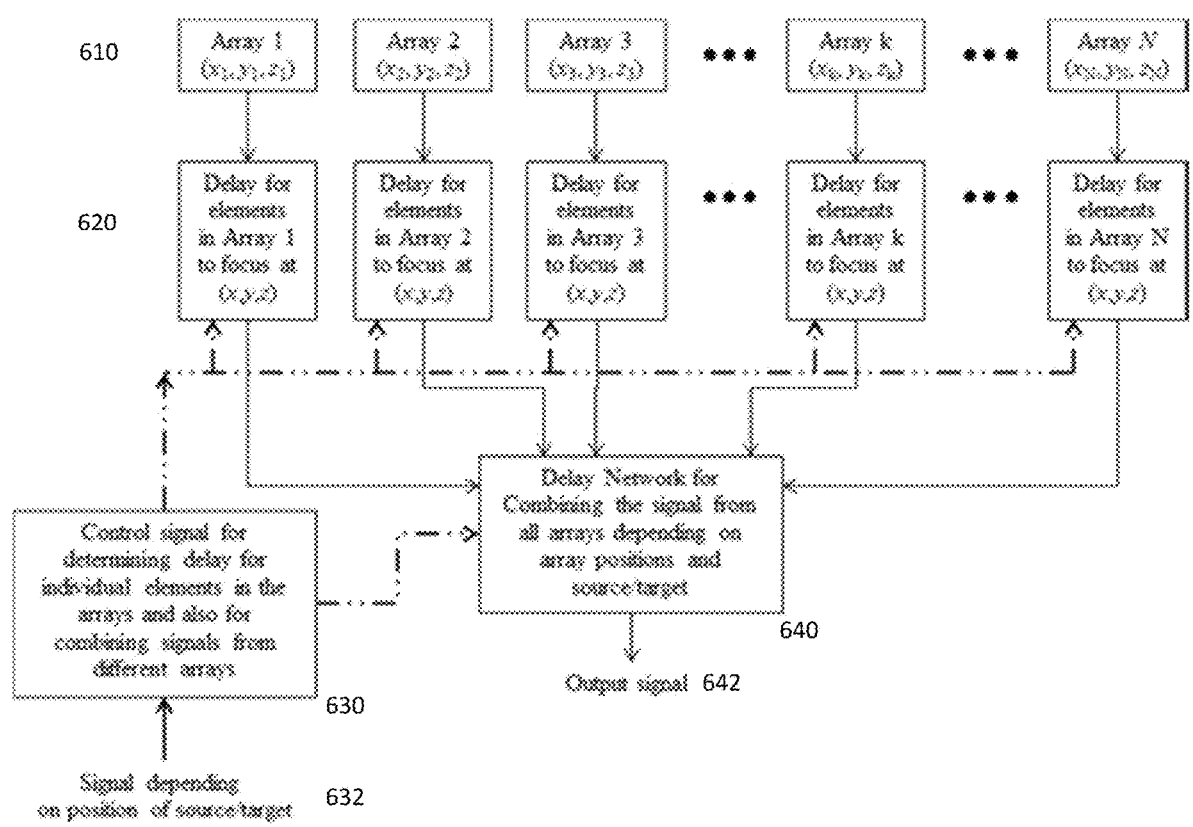
FIG. 6 is the block diagram for the illustration of control signal delay determination for each microphone and microphone array and two steps delay network for combining audio signal from all arrays depending on array positions and target sound source.

FIG. 4 shows the position identification of the target using CCTV camera by dividing 2-dimensional (2-D) plane in the rectangular grid, according to an exemplary embodiment. FIG. 5 shows the incorporation of delay network 540 in the apparatus for the compensation of phase delays incurred because of the position of the planar microphone arrays 400. FIG. 6 is the block diagram for the illustration of control signal delay determination for each microphone and microphone array, and two steps delay network for combining audio signal from all arrays depending on array positions and target sound source.

Referring to FIG. 4, the microphones arrays MA1 to MAN are focused to the identified target for capturing sound. FIG. 4 represents the premises where close circuit television (CCTV) camera 410 is installed for public safety and security in places such as waiting lounges of airports, subway stations etc. The video signal is normally monitored by the security personals. They can monitor the activities of the people shown in the CCTV camera 410 monitors. In case of any unwanted/undesired activity by any individual the security team can act accordingly. In this scenario, only visuals are available to monitor the activities of the individuals. In the present exemplary embodiment, planar microphone arrays MA1 to MAN are installed along with CCTV cameras 410 in the waiting lounge or similar places for audio monitoring of the individuals. Normally such places are too noisy to hear anything from any individual. Therefore, by arranging/installing planar microphone arrays MA1 to MAN at various places in the environment the security personal can focus all the microphone arrays at any desirable position or at any individual and be able listen his/her conversation.

Precisely, the visual monitoring linked with audio monitoring of a target sound source 420 is presented in this invention. For exact identification of target, the video monitor is divided into a grid 430 as shown in FIGS. 4 and 5. Each element of the grid 430 is assigned unique array indices and e.g., (B, 1) may be selected from the monitor and this information 440 is passed on to the Delay network 540 for focusing of all the individual planar microphone arrays at the target sound source 420 to generate the output signal 642 as shown in FIG. 5.

Figure 7:
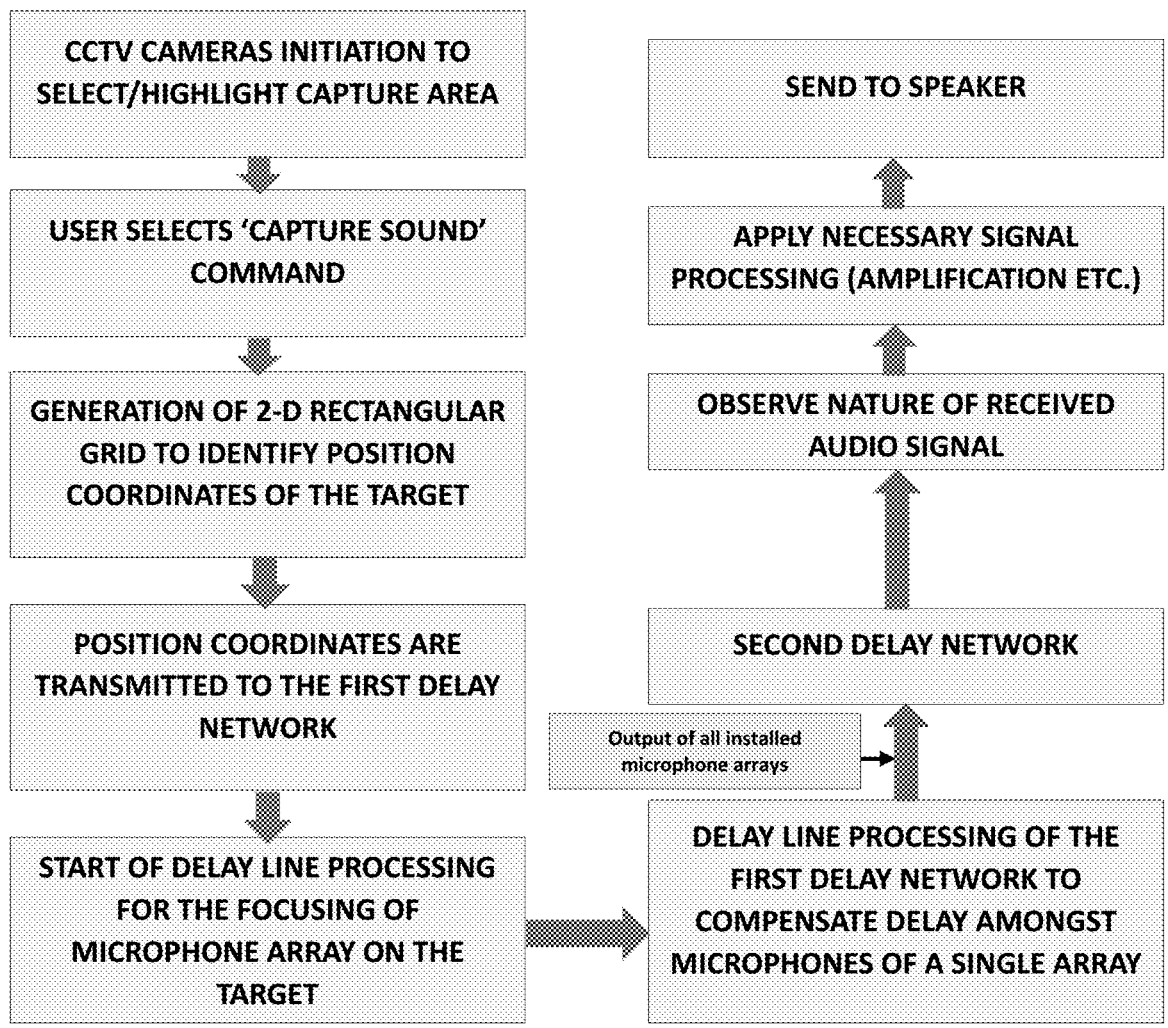
FIG. 7 shows a flowchart illustrating processes implementing a delay network applied to the microphone arrays.

Referring to FIG. 6 and FIG. 7, all the individual microphone arrays 610 are focused at the target located at (x, y, z). The individual arrays use their position $(x_k, y_k, z_k)$ along with the position of the individual microphones in the array, and target position (x, y, z) to calculate the delays required by individual microphone in the microphone array. All the arrays 610 are focused at the target and give their combined/enhanced signal after adjusting the time delays at individual microphones with the array at their output. The output from all the microphone arrays is received at the Delay network 640, where further adjustment of the time delay incurred due to the position of the individual microphone arrays relative to each other. The delay network 640 then combines the signals from all the microphone arrays 610 to generate an output signal 642 having a much stronger signal, as shown in FIG. 6. According to the exemplary embodiments, control signals 630 for determining delay for individual microphones in the microphone arrays and also for combining signals from different microphone arrays are generated in response to receiving signal 632 indicating position of the target sound source. The generated control signals 630 is then used in adjusting the time delays at individual microphones and combining the signal from all the microphone arrays 610. Due to the distribution of the microphone arrays at various places the effective size of the receiving arrays became large and hence gives high directionality. The exemplary embodiments may improve the accuracy of in security and surveillance situations. The complete schematic of audio and video monitoring system is shown in FIG. 6. According to the exemplary embodiments, a single processor may be provided to receive audio signals from the microphone arrays, generate the control signals for determining the delays, and applying the delays to combine all the signals from all arrays depending on array positions and target sound source and generate the output signal.

According to the exemplary embodiments, the inventive idea uses a number of microphone planar microphone arrays for increasing the directionality of the audio microphones and also enhances the overall gain of the sound signal and suppresses the unwanted sounds from undesired directions. The target sound source is identified from the surveillance video and its position coordinates relative to a common reference point are acquired from the video signals (from multiple CCTV cameras). Whereas, these position coordinates are communicated to the acoustic setup for calculating the distance and direction of the sound source from the individual microphones and this information is used for compensating the delays incurred and thus focusing at the sound source.

An array of acoustic system including of microphone planar microphone arrays, to receive sound from a specific direction, along with its integration with video surveillance is presented here for spying on individuals involved in undesirable activities in crowded places such as airport lounges, subway terminals, and shopping malls etc. The complete system includes multiple closed-circuit television (CCTV) cameras and highly directional planar microphone arrays installed on the ceiling and walls of the environment under surveillance. Once the suspect is identified from the video signal, its exact location is extracted from multiple video signals. The position of the suspect thus obtained is used to calculate the excess delay at various microphones in an array and among different microphone arrays. This excess delay thus calculated is used in the delay network to focus all the microphones on the suspect. Thus, enabling the system to listen to the conversation of the identified suspect and cancelling all the sounds from undesired directions. The directionality of any antenna is proportional to the effective antenna aperture i.e., larger the effective antenna aperture greater is the directionality of the antenna. Therefore, due to the installation of multiple microphone arrays in the entire premises the overall effective aperture of the microphones arrays becomes very large, thus achieving high directionality in receiving the sound signal. This high directionality helps in suppressing the signals from the undesired direction and effectively suppresses the echoes in the environment.

Additionally, the system has capability to execute series of steps including (a) signal processing and echo cancellation of the incoming audio signal (b) direction of arrival estimation of the acoustic signal (c) developed software having graphical user interface for processing audio and visual contents.

The certain drawings and embodiments have been used to describe the present disclosure. However, many modifications, and deletions may be incorporated without departing from the scope of the invention as hereinafter claimed along with their legal equivalents. In addition, embodiment's features may be combined with each other without precluding the scope of the invention described by the inventor.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A directional audio and video surveillance system for an indoor area, the surveillance system comprising:
    a plurality of planar microphone arrays respectively installed at multiple different locations within the indoor area, the plurality of planar microphone arrays being configured to generate audio signals, each planar microphone array of the plurality of planar microphone arrays including a plurality of microphones configured to capture an audio conversation of at least one targeted subject located in the indoor area;
    a plurality of close circuit television (CCTV) cameras configured to capture video signals that identify a position of the targeted subject within the indoor area, the plurality of CCTV cameras being integrated to the plurality of planar microphone arrays to capture the audio conversion of the targeted subject;
    a signal processor configured to analyze the generated audio signals received from the plurality of planar microphone arrays, the signal processor being configured to analyze the captured video signals and calculate position coordinates of the targeted subject from the video signals by defining the indoor area in grids and identifying the position coordinates of the targeted subject using a graphical user interface;
    a first delay network including a plurality of first delay compensating modules, each first delay compensating module being respectively located at an output of a single microphone planar microphone array of the plurality of planar microphone arrays, each first delay compensating module of the plurality of first delay compensating modules determining first delay compensation of a delay of each of the plurality of microphones in the corresponding single microphone planar microphone array, which focuses the respective microphone planar microphone array of the plurality of planar microphone arrays on the identified position coordinates of the targeted subject; and
    a second delay network located at an output of the first delay network to receive the determined first delay compensation from each of the plurality of first delay compensating modules, the second delay network determining second delay compensation of a summed delay of each respective planar microphone array of all of the plurality of planar microphone arrays installed at multiple different locations within the indoor area.

2. The surveillance system of claim 1, wherein the position coordinates of the targeted object are transmitted to the first delay network to compute the delay with respect to positions of the plurality of planar microphone arrays to minimize circuit complexity as compared to transmitting an output of each planar microphone array to a respective individual delay unit.

3. The surveillance system of claim 1, further comprising one noise filtration block configured to select a suitable echo cancelled signal to remove echo.

4. The surveillance system of claim 1, wherein the signal processor includes a front end circuit board.

5. A method of providing a surveillance service using the system of claim 1, the method comprising:
    identifying targeted subject using the CCTV cameras installed at various locations within the indoor area by defining the indoor area in grids;
    recording a conversation of the surveillance target by directing microphone beams to the identified target; and
    receiving, analyzing, and processing the received audio signals using the signal processor.

6. A computer implemented process for providing an audio surveillance service in connection with a video surveillance system including (i) a plurality of planar microphone arrays installed at different locations in a premises and configured to record sound of a targeted object and generate audio signal, each of the plurality of planar microphone arrays including a plurality of microphones configured to capture an audio conversation of the targeted object located in the premises, (ii) a plurality of close circuit television (CCTV) cameras installed at various locations in the premises and configured to analyze captured video signals from the CCTV cameras to identify the targeted object from the video surveillance system and integrated to the plurality of planar microphone arrays, and (iii) a first delay network and a second delay network, the computer implemented process comprising:
    providing flexibility in existing CCTV software to select the targeted object in the premises from received video signals;
    selecting the targeted object in the premises and calculating position coordinates of the targeted object from the video signals by defining an area of the premises into grids;
    recording conversation of the targeted object; and
    generating an amplified and filtered recording of the targeted object by receiving and analyzing the generated audio signals using the first delay network to focus the respective microphone planar microphone array of the plurality of planar microphone arrays on the position coordinates of the targeted object, and the second delay network to determine second delay compensation of a summed delay of each respective planar microphone array of all of the plurality of planar microphone arrays installed at multiple different locations within the area.

7. The computer implemented process of claim 6, wherein the generation of the amplified and filtered recording of the targeted object is performed by:
    determining a first delay to be introduced in a single microphone array of the plurality of planar microphone arrays to focus in response to the location of the targeted object identified by the CCTV cameras;
    applying a first delay compensating module, the first delay compensating module including (i) a delay compensating unit for all microphones in the single microphone array of the plurality of planar microphone arrays, and (ii) an adder circuit configured to combine outputs from each of the microphones of the delay compensating unit;
    determining a second delay related to positioning of the remaining microphone arrays of the plurality of planar microphone arrays to focus on the targeted object identified by the CCTV camera and combining signals from all of the plurality of planar microphone arrays in response to the location of the targeted object;

applying the second delay network to the outputs of each of the plurality of planar microphone arrays for targeting a highly-directional signal to the target object and receiving the audio signal; and generating an output audio signal of the targeted object after applying delay compensating networks, signal processing, amplification, and echo cancellation.

\* \* \* \* \*